H. BARNARD.
GOLD WASHER.
No. 19,338. Patented Feb. 16, 1858.
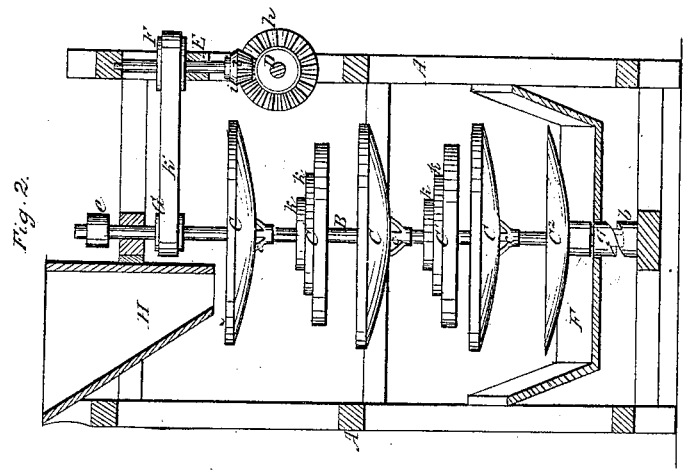
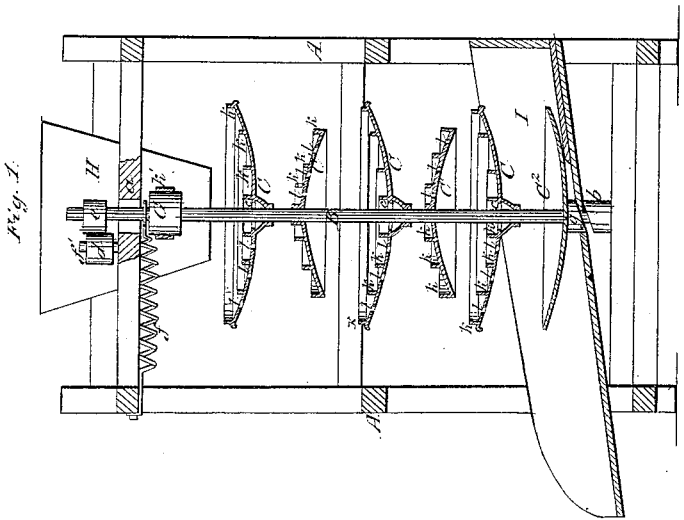

UNITED STATES PATENT OFFICE.

HENRY BARNARD, OF MORRISTOWN, NEW YORK.

GOLD-WASHER.

Specification of Letters Patent No. 19,338, dated February 16, 1858.

*To all whom it may concern:*

Be it known that I, HENRY BARNARD, of Morristown, in the county of St. Lawrence and State of New York, have invented a new and Improved Gold-Washer and Ore-Separator; and I do hereby declare that the following is a full, clear, and exact description of the same, reference being had to the accompanying drawings, forming part of this specification, in which—

Figures 1 and 2 are vertical sections of the machine taken in planes at right angles with each other. Fig. 3, is a detail view which will be hereinafter explained.

Similar letters of reference in each of the several figures indicate corresponding parts.

This machine consists of a series of concave and convex pans furnished with a series of annular retention rims projecting from their upper side; said pans being arranged, one below another, fast on an upright shaft which rotates horizontally, vibrates laterally and also vertically, simultaneously by means of suitable mechanism. The pans are alternately larger and smaller in size than one another from the top to the bottom of the series and alternately concave or convex, and the substances to be washed being introduced with a stream of water into the top one, the precious substances, owing to their greater specific gravity, deposit behind the annular rims, while the foreign substances, and finer particles of gold owing to their lightness are carried down through the central openings of the first pan onto the second pan, which is convex, and the greater part of the precious substances deposit behind the annular rims, while the lighter and foreign substances are carried over the outer periphery of the second pan onto the third pan which is concave and thus the operation goes on until the whole series of pans except the lowest basin have been brought into play and the whole of the precious substances separated. The separating operation being completed and the lower basin cleaned, a stream of water is admitted onto the several basins and the precious metals which were retained by the annular rims are carried down by said stream of water, by means of perforations provided in the bottom of the basins and deposited into the lowest basin in a condition ready for removal.

To enable others skilled in the art, to make and use my invention, I will proceed to describe its construction and operation.

A, is the frame of the machine which may be of wood or iron.

B, is the pan shaft, the lower end of which is fitted to a stationary bearing $b$, in the lower part of the framing, and the upper part of which is fitted to a slot $a$, in the upper portion of the framing, to permit a vibrating motion. A sliding journal box should be fitted to the slot $a$, to receive that part of the shaft which is within the slot.

C, C', are the pans exhibited in section in Fig. 1, secured to the shaft B, which passes through their centers. All of these pans are circular, and those C, are concave from the edges to the center as shown in Fig. 1, while those C' are convex. The convex pans are smaller in diameter, than the concave pans as exhibited in Figs. 1 and 2. Each of the pans C, is provided with an opening $c$, near its center or lowest point, around the shaft B. A series of annular rims $k$, $k$, project up from the upper side of each of the pans. These rims serve to retain the gold or heavier metals, while the lighter or foreign substances float above them and pass off with the water. With this arrangement of pans with rims a very perfect and thorough separation of the precious metals from the foreign substances can be effected, as so many stops are put in the way of its escape with the water and foreign substances. In the bottom of each of the pans, just behind each of the rims, one or more holes $l$, are provided so that the gold, which has been retained by the rims, shall when the pans are in motion and a stream of water passing through them, have a chance to pass down through the machine and deposit in the basin $C^2$, in order to be removed readily.

D, is a horizontal driving shaft fitted to proper bearings on the frame A, and geared by bevel gearing $h$, $i$, with a vertical shaft E, which is also fitted to bearings on the frame A, and which carries a pulley F, from which a belt $k'$, runs to a pulley G, on the pan shaft B, for the purpose of imparting the rotary motion to the said shaft. Near the bottom of the pan shaft is secured a cam $g$, having a spiral formed lower face which fits to a space of corresponding form at the top of the stationary lower bearing $b$, of the shaft. This cam $g$, rotating in contact with the spiral formed face of the bearing $b$, gives the shaft a vertical or longitudinal reciprocating motion as it performs its rotary motion. Near the top of the pan shaft there is secured a cam $e$, which is kept by a spring $f$, applied to the shaft, in contact with a roller $d$, which is fitted to rotate on a fixed stud $f^1$, secured in the top of the framing at one end of the slot $a$. The cam $e$, by its rotary motion in contact with the roller $d$, as the pan shaft rotates, causes the upper part of the shaft to receive the vibrating motion, which is provided for by the slot $a$.

H, is a hopper into which the crushed or other auriferous or metalliferous matter is fed, to be supplied therefrom into a proper screen, not shown, but to be arranged above the uppermost pan C; along with a properly regulated quantity of water which is supplied continuously to the hopper.

I, is an inclined chute broader than the lowest and largest basin $C^2$, arranged below the said basin to receive and convey away the overflowing water and dirt or foreign matter therefrom.

The operation of the machine is as follows: Rotary motion being imparted to the shaft B, by the means provided for that purpose, it is caused to receive at the same time through the cams $g$, and $e$, the vertical or longitudinal reciprocating and vibrating motions, and thus to impart a corresponding motion to the several pans; and on the gold, or ore, and water being supplied from the hopper H, through a screen, to the uppermost of the series of pans C, the said matter is caused, by the movements of the pans and the water together, to be agitated in such a manner that the overflow of water over the sides of the pans from one to the next below it throughout the series, and from the lowest of the series to the chute I, is caused to wash away the lighter earthy, and most of the foreign matter that is mixed with the gold or metal, which latter by reason of its greater specific gravity subsides or deposits to the bottoms of the pans behind the rims, where it is retained by the rims the heaviest particles being retained in the uppermost pan, and the portions which may be washed from this pan by the greater degree of agitation therein being retained behind the rims of one or other of the pans below, in which the agitation is less and less intense the nearer they are to the bottom of the series, by which graduated agitation all the valuable particles may be saved, the heavier particles being retained in the higher and the lightest in the lower pans. The pebbles or lumps of uncrushed ore or other large piece are retained by the screen above the first pan and prevented entering the pans. This operation is continuous for any length of time, but as soon as a sufficient quantity of washed gold or metal, separated from ore, has been obtained in the pans, the supply of the gold or ore to and from the hopper H, is stopped, and clean water alone supplied to the pans for a short time, to effect a more perfect washing of the metal, retained in the pans, and its passage down through the machine into the lower basin from whence it may be abstracted by shoveling or scooping.

What I claim as my invention and desire to secure by Letters Patent, is—

The employment of a series of pans C, C′, furnished with a series of annular retention rims, $k$, projecting from their upper side, and arranged, one below another, fast on a horizontal revolving, and vibrating shaft, and being alternately larger or smaller in size than one another, from the top to the bottom of the series, and alternately inclined inward and outward, or made concavo and convex, substantially as and for the purposes set forth.

H. BARNARD.

Witnesses:
   G. YORKE AT LEE,
   B. W. FENWICK.